United States Patent
Li et al.

(10) Patent No.: US 12,407,668 B2
(45) Date of Patent: Sep. 2, 2025

(54) AUTHORIZATION OF CONSUMER NETWORK FUNCTIONS

(71) Applicant: Telefonaktiebolaget LM Ericsson (publ), Stockholm (SE)

(72) Inventors: Songmao Li, Shanghai (CN); Christine Jost, Dalby (SE); Jesus Angel De Gregorio Rodriguez, Madrid (ES); Dan Xu, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/558,587

(22) PCT Filed: Apr. 14, 2022

(86) PCT No.: PCT/EP2022/059974
§ 371 (c)(1),
(2) Date: Nov. 2, 2023

(87) PCT Pub. No.: WO2022/248118
PCT Pub. Date: Dec. 1, 2022

(65) Prior Publication Data
US 2025/0168155 A1    May 22, 2025

Related U.S. Application Data

(60) Provisional application No. 63/192,251, filed on May 24, 2021.

(51) Int. Cl.
*H04L 9/40*    (2022.01)
(52) U.S. Cl.
CPC ................. *H04L 63/0807* (2013.01)
(58) Field of Classification Search
CPC .................................. H04L 63/0807
See application file for complete search history.

(56) References Cited

U.S. PATENT DOCUMENTS

2021/0234706 A1*  7/2021  Nair ................ H04L 63/0884
2021/0250172 A1*  8/2021  Choyi .............. H04L 9/3239
(Continued)

OTHER PUBLICATIONS

"3GPP TS 33.501 V17.1.0", 3rd Generation Partnership Project; Technical Specification Group Services and System Aspects; Security architecture and procedures for 5G system (Release 17), Mar. 2021, pp. 1-256.

(Continued)

*Primary Examiner* — Clayton R Williams
(74) *Attorney, Agent, or Firm* — Murphy, Bilak & Homiller, PLLC

(57) ABSTRACT

Embodiments include methods performed by a service consumer network function (NF) of a communication network. Such methods include sending, to a network repository function (NRF) of the communication network, a request for an access token for notifications from a service producer NF of the communication network. The request includes a list of alternative notification endpoints. Such methods also include receiving, from the NRF, an access token for the notifications from the service producer NF. The access token includes the list of alternative notification endpoints. Such methods also include sending, to the service producer NF, a subscription request for the notifications. The subscription request includes the received access token, a primary notification endpoint, and binding information usable for selecting an alternative notification endpoint from the list. Other embodiments include complementary methods performed by NRFs and service producer NFs, as well as network nodes/functions that perform such methods.

22 Claims, 8 Drawing Sheets

(56) References Cited

U.S. PATENT DOCUMENTS

| | | | | |
|---|---|---|---|---|
| 2021/0258788 | A1* | 8/2021 | Bykampadi | H04L 67/02 |
| 2023/0217241 | A1* | 7/2023 | Velev | H04W 8/20 |
| | | | | 455/414.1 |

OTHER PUBLICATIONS

"3GPP TS 23.501 V17.0.0", 3rd Generation Partnership Project; Technical Specification Group Services and System Aspects; System architecture for the 5G System (5GS); Stage 2 (Release 17), Mar. 2021, pp. 1-489.

"Clarifications of Binding concepts", 3GPP TSG-CT WG4 Meeting #98e, E-Meeting, C4-203131 (CP-201030), Jun. 2-12, 2020, pp. 1-7.

"Correction to access token storage in NF service consumer", 3GPP TSG-SA3 Meeting #102-e, e-meeting, Online, S3-210736 (SP-210109), Jan. 18-29, 2021, pp. 1-7.

"3GPP TR 33.875 V0.2.0", 3rd Generation Partnership Project; Technical Specification Group Services and System Aspects; Study on enhanced security aspects of the 5G Service Based Architecture (SBA); (Release 17), Mar. 2021, pp. 1-20.

"3GPP TS 29.510 V17.1.0", 3rd Generation Partnership Project; Technical Specification Group Core Network and Terminals; 5G System; Network Function Repository Services; Stage 3 (Release 17), Mar. 2021, pp. 1-259.

"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.

"3GPP TS 23.501 V15.5.0", 3rd Generation Partnership Project; Technical Specification Group Services and System Aspects; System Architecture for the 5G System; Stage 2 (Release 15), Mar. 2019, pp. 1-241.

Hardt, D., "The OAuth 2.0 Authorization Framework", RFC 6749, Internet Engineering Task Force, IEFT; Standard Internet Society (ISOC) 4, Oct. 13, 2012, pp. 1-76.

Jones, M., et al., "JSON Web Signature (JWS)", Internet Engineering Task Force (IETF), Request for Comments: 7515, Category: Standards Track, May 2015, pp. 1-59.

Jones, M., et al., "JSON Web Token (JWT)", Internet Engineering Task Force (IETF), Request for Comments: 7519, Category: Standards Track, ISSN: 2070-1721, May 2015, pp. 1-30.

* cited by examiner

AUTHORIZATION OF CONSUMER NETWORK FUNCTIONS

TECHNICAL FIELD

The present disclosure relates generally to the field of communication networks, and more specifically to techniques for ensuring that notifications of available data are only sent to network functions (NFs) in a communication network that are authorized to receive such notifications.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

At a high level, the 5G System (5GS) consists of an Access Network (AN) and a Core Network (CN). The AN provides UEs connectivity to the CN, e.g., via base stations such as gNBs or ng-eNBs described below. The CN includes a variety of Network Functions (NF) that provide a wide range of different functionalities such as session management, connection management, charging, authentication, etc.

FIG. 1 illustrates a high-level view of an exemplary 5G network architecture, consisting of a Next Generation Radio Access Network (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, as described in more detail below.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof. Each of the gNBs can serve a geographic coverage area including one more cells and, in some cases, can also use various directional beams to provide coverage in the respective cells.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501 (v15.5.0). If security protection for CP and UP data on TNL of NG-RAN interfaces is supported, NDS/IP (3GPP TS 33.401 (v15.8.0)) shall be applied.

The NG RAN logical nodes shown in FIG. 1 include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry.

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Each of the gNBs may include and/or be associated with a plurality of Transmission Reception Points (TRPs). Each TRP is typically an antenna array with one or more antenna elements and is located at a specific geographical location. In this manner, a gNB associated with multiple TRPs can transmit the same or different signals from each of the TRPs. For example, a gNB can transmit different version of the same signal on multiple TRPs to a single UE. Each of the TRPs can also employ beams for transmission and reception towards the UEs served by the gNB, as discussed above. In some embodiments, the TRPs may be associated with gNB-DUs.

Another change in 5G networks (e.g., in 5GC) is that traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context. This 5G SBA model is based on principles including modularity, reusability and self-containment of NFs, which can enable network deployments to take advantage of the latest virtualization and software technologies.

3GPP TR 33.875 (v0.2.0) describes a "Study on enhanced security aspects of the 5G Service Based Architecture (SBA)". One issue to be addressed by this study is service access a in "Subscribe/Notify" scenarios, particularly the risk that a service producer NF may send a notification message to an unauthorized NF consumer if the notification uniform resource identifier (URI) in the subscribe request is not authorized. There are some proposals to authorize a callback URI by the NRF to mitigate the security issue.

Binding for notifications can be created as part of an explicit or implicit subscription request. The subscription request may include a Binding Indication referring to a NF service instance and NF Set and may also include a service name of the service consumer NF. The NF Set ID, NF service instance ID, and service name relate to the service of a service consumer NF that will handle the notification.

For direct communication, a service producer NF selects a target for the related notifications using the notification endpoint received in the subscription request. If the notification endpoint included in the subscription is not reachable, the received Binding Indication is used to discover an alternative notification endpoint. For indirect communication, the service producer NF includes the notification endpoint received in the subscription and may include a Routing Binding Indication with the same contents as the received Binding Indication. If the notification endpoint included in the subscription is not reachable, a Service Communication Proxy (SCP) selects the target for the related notifications using the received Routing Binding Indication.

SUMMARY

However, there are various problems, issues, and/or difficulties that can occur when using Binding Indication or Routing Binding Indication to determine a notification endpoint. Embodiments of the present disclosure address these and other problems, issues, and/or difficulties, thereby enabling the otherwise-advantageous deployment of SBA in a 5G system.

Some embodiments of the present disclosure include methods (e.g., procedures) for a service consumer NF of a communication network. These exemplary methods can include sending, to a network repository function (NRF) of the communication network, a request for an access token for notifications from a service producer NF of the communication network. The request includes a list of alternative notification endpoints. These exemplary methods can also include receiving, from the NRF, an access token for the notifications from the service producer NF. The access token includes the list of alternative notification endpoints. These exemplary methods can also include sending, to the service producer NF, a subscription request for the notifications. The subscription request includes the received access token, a primary notification endpoint, and binding information usable for selecting an alternative notification endpoint for the notifications.

In some embodiments, these exemplary methods can also include receiving at least one notification from the service producer NF via an alternative notification endpoint that is included in the access token and is also indicated by the binding information. In some of these embodiments, the subscription request is sent to the service producer NF via a service communication proxy (SCP) and the at least one notification is received via the alternative notification endpoint and the SCP.

In other embodiments, the request for the access token and the subscription request are on behalf of a second service consumer NF of the communication network, and the list of alternative notification endpoints is associated with the second service consumer NF.

In some embodiments, the list of alternative notification endpoints is included in an AccessTokenClaims field of the access token. In some of these embodiments, the list of alternative notification endpoints comprises a list of NF Set identifiers (IDs) of service consumer NFs that are alternative notification endpoints for which the AccessTokenClaims field is applicable.

Other embodiments include exemplary methods (e.g., procedures) for a service producer NF of a communication network (e.g., 5GC). These exemplary methods can include receiving, from a service consumer NF of the communication network, a subscription request for notifications from the service producer NF. The subscription request can include an identifier of a primary notification endpoint, binding information usable for selecting an alternative notification endpoint for the notifications, and an access token for receiving the notifications. The access token includes a list of alternative notification endpoints.

In some embodiments, the subscription request is on behalf of a second service consumer NF of the communication network and the list of alternative notification endpoints is associated with the second service consumer NF.

In some embodiments, these exemplary methods can also include the following: based on determining that the primary notification endpoint is unavailable, selecting an alternative notification endpoint based on the binding information; and based on verifying that the selected alternative notification endpoint is included in the access token, sending at least one notification to the selected alternative notification endpoint.

In other embodiments, these exemplary methods can also include the following: verifying the binding information against the list of alternative notification endpoints included in the access token; sending the identifier of the primary notification endpoint and the verified binding information to the SCP; and subsequently sending the notifications to the SCP for delivery to the primary notification endpoint or an alternative notification endpoint, i.e., a verified alternative notification endpoint indicated by the binding information and the access token.

In some embodiments, the list of alternative notification endpoints is included in an AccessTokenClaims field of the access token. In some of these embodiments, the list of alternative notification endpoints comprises a list of NF Set IDs of service consumer NFs that are alternative notification endpoints for which the AccessTokenClaims field is applicable.

Other embodiments include methods (e.g., procedures) for an NRF of a communication network. These exemplary methods can include receiving, from a service consumer NF of the communication network, a request for an access token for notifications from a service producer NF of the communication network. The request can include a list of alternative notification endpoints. These exemplary methods can also include authorizing the request based on verifying the alternative notification endpoints. These exemplary methods can also include, based on authorizing the request, sending to the service consumer NF an access token for receiving the notifications from the service producer NF. The access token includes the list of alternative notification endpoints.

In some embodiments, authorizing the request can include verifying that the alternative notification endpoints match corresponding values in one of the following: a public key certificate of the service consumer NF, or a NF profile of the service consumer NF.

In other embodiments, the request for the access token is on behalf of a second service consumer NF of the communication network and the list of alternative notification endpoints is associated with the second service consumer NF.

In some embodiments, the list of alternative notification endpoints is included in an AccessTokenClaims field of the access token. In some of these embodiments, the list of alternative notification endpoints comprises a list of NF Set IDs of service consumer NFs that are alternative notification endpoints for which the AccessTokenClaims field is applicable.

Other embodiments include service consumer NFs, service producer NFs, and NRFs (or network nodes hosting the same) that are configured to perform the operations corresponding to any of the exemplary methods described herein. Other embodiments also include non-transitory, computer-readable media storing computer-executable instructions that, when executed by processing circuitry associated with such service consumer NFs, service producer NFs, and NRFs, configure the same to perform operations corresponding to any of the exemplary methods described herein.

These and other embodiments described herein can improve security in a communication network by an access token that indicates an expected consumer NF Set that is authorized by the network (e.g., NRF) to receive notifications a service producer NF. This information in the access token can be used by the service producer NF to ensure that it sends notification messages to authorized notification receivers. This can improve security of the 5G SBA by mitigating various attack scenarios.

These and other objects, features, and advantages of the present disclosure will become apparent upon reading the following Detailed Description in view of the Drawings briefly described below.

DETAILED DESCRIPTION

Figure 1:
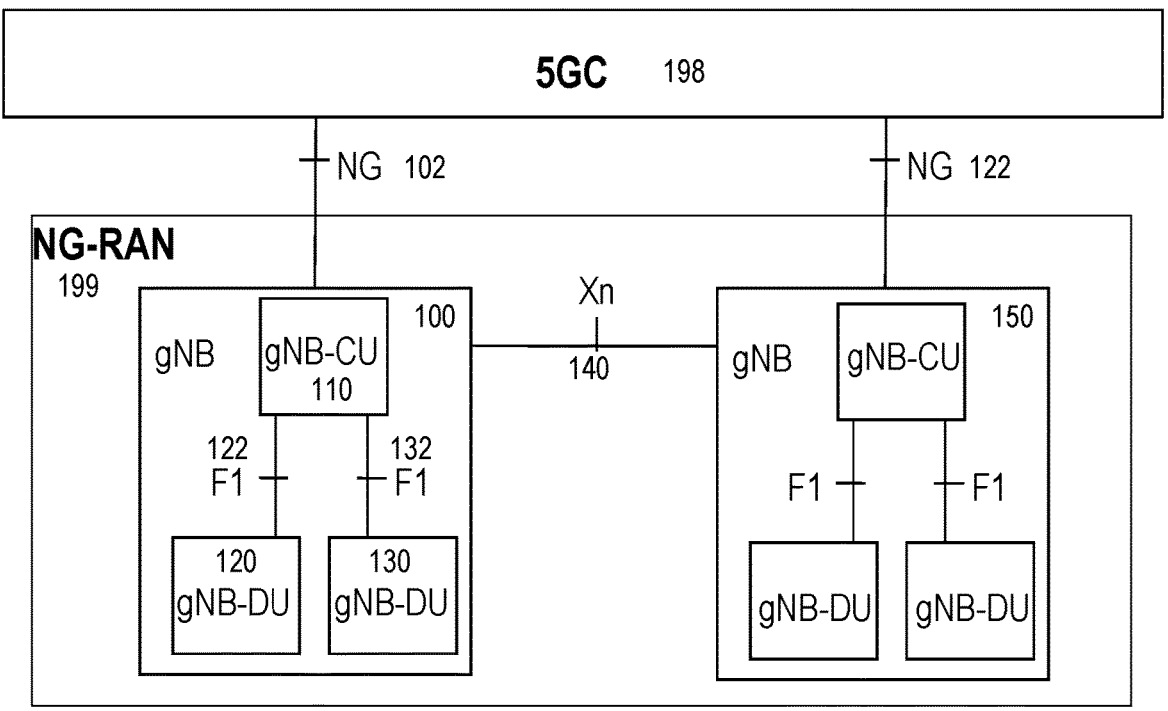
FIGS. 1-2 illustrate various aspects of an exemplary 5G network architecture.

Embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features and advantages of the disclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), etc. A core network node can also be a node that implements a particular core network function (NF), such as an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Service: As used herein, the term "service" refers generally to a set of data associated with one or more applications, which is to be transferred via a network with certain specific delivery requirements that need to be fulfilled in order for the one or more applications to be successful.

Component: As used herein, the term "component" refers generally to any component needed for the delivery of a service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", which is an entity that can collect historical information about utilization of resources as well as provide information about the current and the predicted future availability of resources associated with that component (e.g., a RAN manager).

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, there are various problems, issues, and/or difficulties that can occur when using Binding Indication or Routing Binding Indication to determine a notification endpoint for a consumer NF in the 5G SBA. These are discussed in more detail below after the following description of the 5G SBA.

Figure 2:
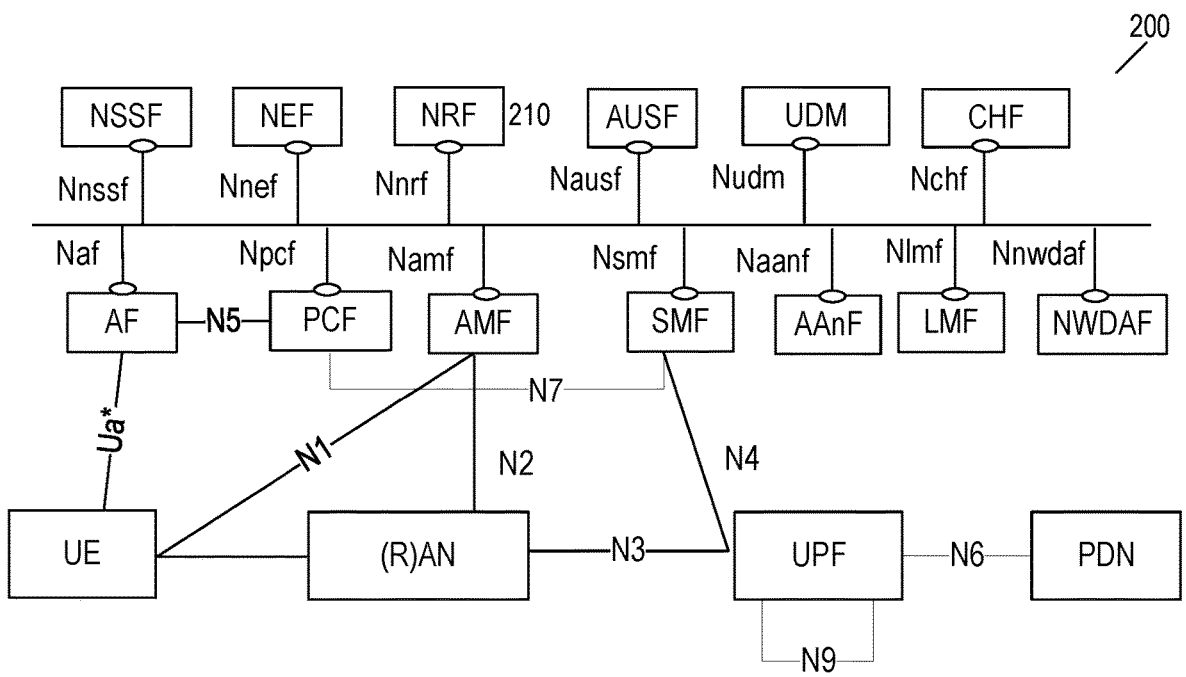

FIG. 2 shows an exemplary non-roaming reference architecture for a 5G network (200). These include the following 3GPP-defined NFs and service-based interfaces:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)—supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.

Network Exposure Function (NEF) with Nnef interface—acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs.

Network Repository Function (NRF, 210) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Network Data Analytics Function (NWDAF) with Nnwdaf interface—provides network analytics information (e.g., statistical information of past events and/or predictive information) to other NFs on a network slice instance level.

Location Management Function (LMF) with Nlmf interface-supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

The NRF allows every NF to discover the services offered by other NFs, and Data Storage Functions (DSF) allow every NF to store its context. In addition, the NEF provides exposure of capabilities and events of the 5GC to AFs within and outside of the 5GC. For example, NEF provides a service that allows an AF to provision specific subscription data (e.g., expected UE behavior) for various UEs.

Communication links between the UE and a 5G network (AN and CN) can be grouped in two different strata. The UE communicates with the CN over the Non-Access Stratum (NAS), and with the AN over the Access Stratum (AS). All the NAS communication takes place between the UE and the AMF via the NAS protocol (N1 interface in FIG. 2). Security for the communications over this these strata is provided by the NAS protocol (for NAS) and the PDCP protocol (for AS).

The services provided by the various NFs are composed of "service operations", which are more granular divisions of the overall service functionality. The interactions between service consumers and producers can be of the type "request/response" or "subscribe/notify". In the latter type, a service consumer NF (or equivalently, "service consumer NF") requests a service producer NF (or equivalently, "service producer NF") to establish a subscription for the service consumer NF to receive notifications from the service producer NF under conditions specified in this subscription.

Figure 3:
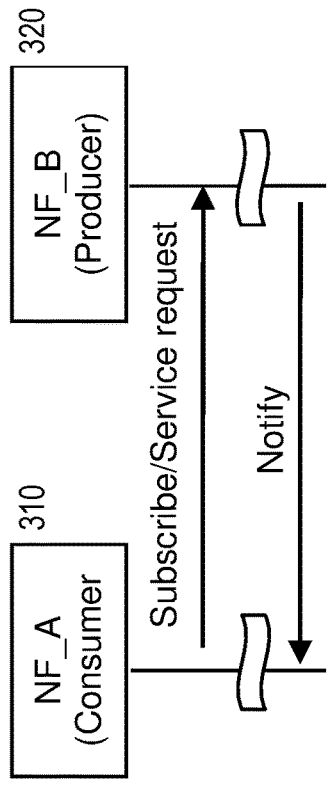
FIGS. 3-5 illustrates various arrangements in which a service consumer NF subscribes to notifications from a service producer NF, according to various embodiments of the present disclosure.

FIG. 3 shows an exemplary "Subscribe/Notify" arrangement in which a service consumer NF (e.g., NF_A 310) subscribes to notifications from a service producer NF (e.g., NF_B 320), either explicitly or implicitly. The subscription or service request includes the notification endpoint (e.g., notification URL) of the service consumer NF. In this scenario, NF_A subscribes to the service of NF_B for itself.

Figure 4:
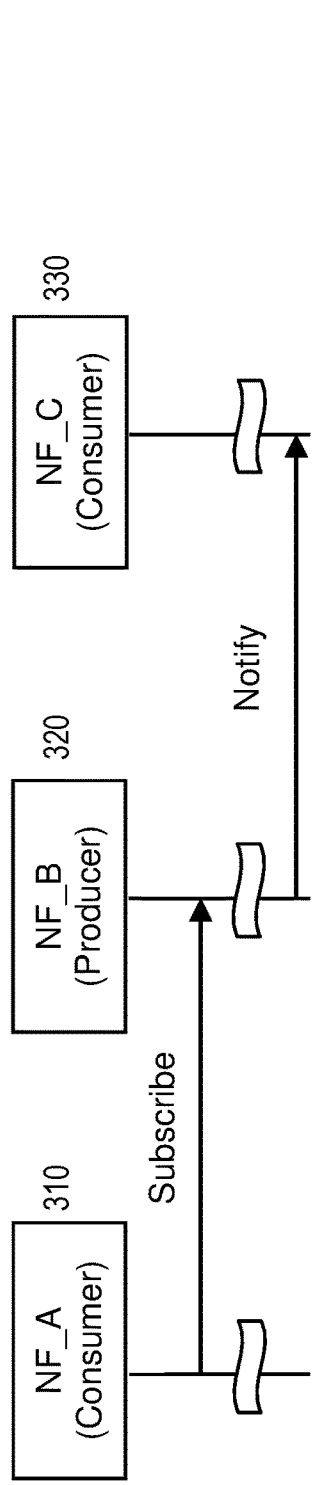

FIG. 4 shows another exemplary "Subscribe/Notify" arrangement in which one service consumer NF (e.g., NF_A 310) subscribes to notifications from a service producer NF (e.g., NF_B 320), either explicitly or implicitly, on behalf of another service consumer NF (e.g., NF_C 330). The notification URI of NR_C is included in the subscription request, and NF_C will receive the notification message even though the subscribe request is sent by NF_A.

Figure 5:
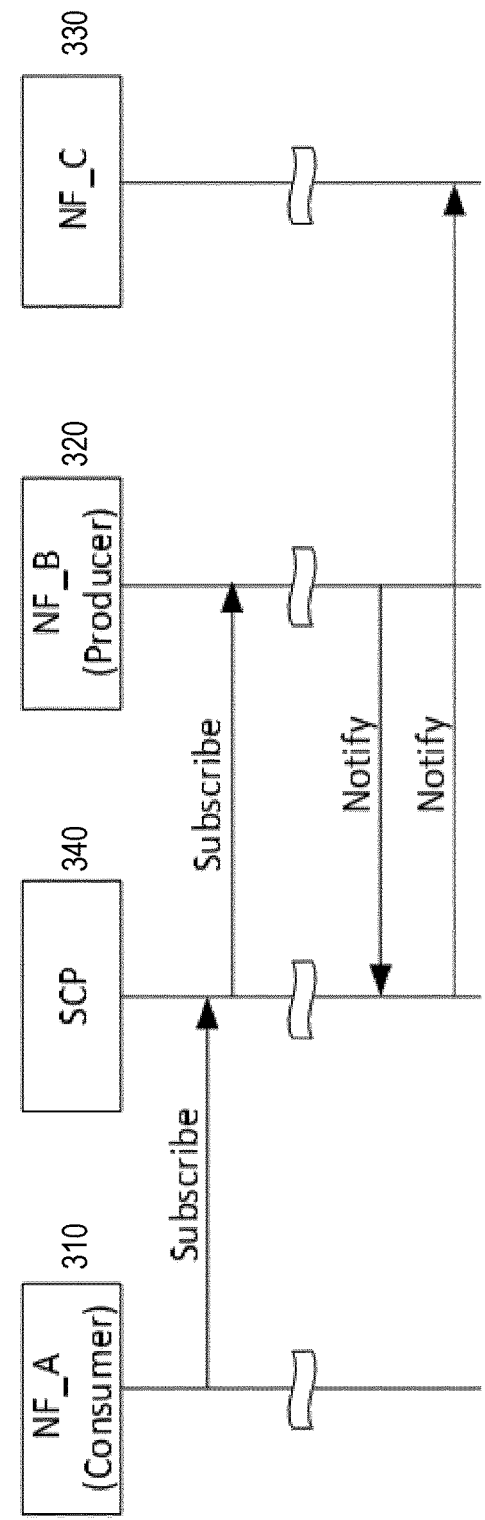

FIG. 5 shows another exemplary "Subscribe/Notify" arrangement whereby a service consumer NF (e.g., NF_A 310) uses an SCP (340) for indirect communication with the service producer NF (e.g., NF_B 320). The SCP routes messages between service consumer NFs and service producer NFs based on the Routing Binding Indication (if available) and may perform discovery and associated selection of the service producer NF on behalf of a service consumer NF. In FIG. 5, the SCP forwards the subscription request to NF_B but since the subscription is on behalf of NF_C (330), the SCP forwards notifications from NF_B to NF_C.

Binding can be used by the service consumer NF to indicate suitable service consumer NF instance(s) for notification target instance selection, reselection and routing of subsequent notification requests associated with a specific notification subscription. Binding indication needs to be stored by the service producer NF and may also be used later if the service consumer NF starts acting as service producer NF, so that service requests can be sent to this service producer NF.

Similarly, binding can be used to indicate suitable target service producer NF instance(s) for an NF service instance selection, reselection, and routing of subsequent requests associated with a specific service producer NF resource (context) and NF service. Binding allows the service producer NF to indicate to the service consumer NF if a particular context should be bound to an NF service instance, NF instance, NF service set or NF set. Binding indication needs to be stored by the service consumer NF. Binding indications are further described in 3GPP TS 23.501 (v17.0.0), including sections 3.1 and 6.3.1.

Additionally, Routing Binding Indication is information included in a request or notification that can be used for discovery and associated selection of a suitable target. Routing binding indication has similar syntax as a binding indication, but it has different purpose. Routing binding indication provides the receiver (i.e., an SCP) with information enabling to route an HTTP request to an HTTP server that can serve the request. Routing binding indication is not stored by the receiver. Routing binding indications are further described in 3GPP TS 23.501 (v17.0.0), including sections 3.1, 6.3.1.0, and 7.1.2.

For direct communication, a service producer NF selects a target for the related notifications using the notification endpoint received in the subscription request. If the notification endpoint included in the subscription is not reachable, the received Binding Indication is used to discover an alternative notification endpoint. For indirect communication, the service producer NF includes the notification endpoint received in the subscription and may include a Routing Binding Indication with the same contents as the received Binding Indication. If the notification endpoint included in the subscription is not reachable, the SCP selects the target for the related notifications using the received Routing Binding Indication.

If the notification endpoint included in the explicit or implicit subscription is not reachable, the consumer NF Set information received in Binding Indication or Routing Binding Indication is used to discover an alternative notification endpoint. In general, an NF Set is a group of interchangeable NF instances of the same type, supporting the same services and the same Network Slice(s). The NF instances in the same NF Set may be geographically distributed but have access to the same context data.

However, the NF Set information in the Binding Indication or Routing Binding Indication may not be authorized by the NRF. Consider an attack scenario where a rogue service consumer NF inserts in the subscription request an unauthorized Binding Indication or Routing Binding Indication that refers to a malicious NF or a NF controlled by a third party. Currently, the service producer NF will send notifications in accordance with the subscription to this unintended and/or unauthorized receiver when the original notification endpoint is not reachable. This poses a significant security risk to the 5G SBA.

Embodiments of the present disclosure address these and other problems, issues, and/or difficulties by providing novel, flexible, and efficient techniques whereby an authorization server (e.g., NRF) adds consumer NF Set information to an access token to indicate the expected consumer NF Set list that is authorized by the NRF to receive notifications. For example, the consumer NF set list can be added as an optional attribute in the AccessTokenClaims data structure, which is defined in 3GPP TS 29.510 (v17.1.0) and explained in more detail below. This information in the access token can be used by a service producer NF to ensure that it sends notification messages to authorized notification receivers. This can improve security of the 5G SBA by mitigating various attack scenarios, including the one summarized above.

Figure 6:
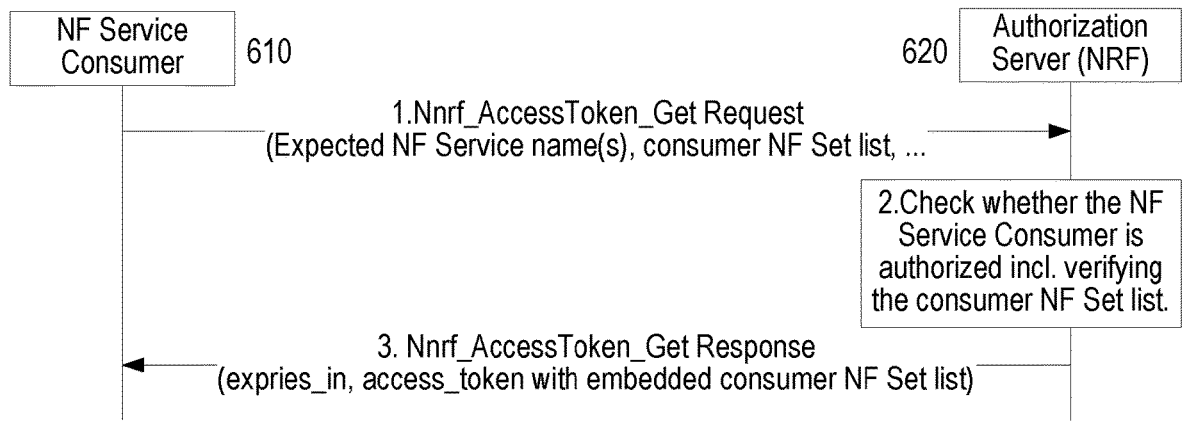
FIG. 6 is a flow diagram of an exemplary procedure for a service consumer NF to obtain an access token for receiving notifications from a service producer NF, according to various embodiments of the present disclosure.

FIG. 6 is a flow diagram of an exemplary procedure for a service consumer NF to obtain an access token for receiving notifications from a service producer NF, according to some embodiments of the present disclosure. In particular, the procedure in FIG. 6 involves a service consumer NF (610) and an Authorization Server (620), such as an NRF. For convenience, these elements and/or functions will be referred to in the following description without their respective reference numbers. Although the operations in FIG. 6 are given numerical labels, this is meant to facilitate explanation rather to imply any strict ordering of the operations, unless specifically stated otherwise.

In operation 1, the service consumer NF requests an access token from the NRF in the same public land mobile network (PLMN) using the Nnrf_AccessToken_Get request operation. The request message includes the NF Instance ID(s) of the service consumer NF, the requested "scope" including the expected NF Service name(s). The message may include "additional scope" information such as requested resources, requested actions (e.g., service operations) on the resources, and NF type(s) of the expected service producer NF instance and service consumer NF.

The service consumer NF may also include a list of NSSAIs or list of NSI IDs for the expected service producer NF instances. NSSAI is a group of one or more single network slice selection assistance information (S-NSSAI), each of which includes a slice type (SST) field that describes expected network behavior and optionally a slice differentiator (SD) field that provides further behavior differentiation. In some cases, the service consumer NF may also include a list of S-NSSAIs of the service consumer NF. In some cases, the service consumer NF may also include the NF Set ID of the expected service producer NF instances.

The requested service or service operation can be a "subscription request", e.g., an explicit subscription or any other kind of service invocation that can be interpreted as an implicit subscription. In the embodiments illustrated by FIG. 6, the message includes a consumer NF Set list for the expected alternative notification receivers.

In operation 2, the NRF verifies that the input parameters (e.g., NF type, consumer NF Set list) in the access token request match with the corresponding ones in the public key certificate of the service consumer NF or with those in the NF profile of the service consumer NF. The NRF checks whether the service consumer NF is authorized to access the requested service(s). If the service consumer NF is authorized, the NRF generates an access token with appropriate AccessTokenClaims included. The NRF digitally signs the generated access token based on a shared secret or private key as described in RFC 7515 published by the IETF. If the service consumer NF is not authorized, the NRF does not issue an access token to the service consumer NF.

The AccessTokenClaims in the token include the NF Instance ID of NRF (issuer), NF Instance ID of the service consumer NF (subject), NF type of the service producer NF (audience), expected service name(s), (scope), expiration time (expiration) and optionally "additional scope" information such as allowed resources and allowed actions (service operations) on the resources. The AccessTokenClaims may include a list of NSSAIs or NSI IDs for the expected service producer NF instances, and/or the NF Set ID of the expected service producer NF instances. In various embodiments, the AccessTokenClaims may include a list of NF Set of service consumer NF for the expected alternative notification receivers. Table 1 below shows a definition of an exemplary AccessTokenClaims data structure according to these embodiments.

TABLE 1

| Attribute name | Data type | P | Cardinality | Description |
| --- | --- | --- | --- | --- |
| iss | NfInstanceId | M | 1 | NF instance id of the NRF., corresponding to the standard "Issuer" claim described in IETF RFC 7519 clause 4.1.1 |

TABLE 1-continued

| Attribute name | Data type | P | Cardinality | Description |
| --- | --- | --- | --- | --- |
| sub | NfInstanceId | M | 1 | NF instance ID of the service consumer NF, corresponding to the standard "Subject" claim described in IETF RFC 7519, clause 4.1.2. |
| aud | Audience | M | 1 | service producer NF's NF instance ID(s) (if exact NF instance(s) of the service producer NF is known) or the NF type of service producer NFs for which the claim is applicable, corresponding to standard "Audience" claim described in IETF RFC 7519, clause 4.1.3. |
| scope | string | M | 1 | Name of the NF services and the resource/operation-level scopes for which the access_token is authorized for use; this claim corresponds to a private claim, as described in IETF RFC 7519 [25], clause 4.3.<br>pattern: '^([a-zA-Z0-9_:—]+)([a-zA-Z0-9_:—]+)*$' |
| exp | integer | M | 1 | Expiration time after which the access_token is considered to be expired, corresponding to the standard "Expiration Time" claim described in IETF RFC 7519 [25], clause 4.1.4. |
| consumerPlmnId | PlmnId | C | 0 . . . 1 | Included if the NRF supports providing PLMN ID of the service consumer NF in the access token claims, to be interpreted for subject (sub IE), as specified in clause 13.4.1.2 of 3GPP TS 33.501. If a service producer NF that receives this IE in the token included in the authorization header does not understand this IE, it shall be ignored. |
| consumerNfSetIdList | array(NfSetId) | O | 1 . . . N | Included if the NRF supports providing a list of NF Set ID of the service consumer NFs (to find alternative notification endpoints) in the access token claims. When present, it shall indicate the expected NF Set ID of the service consumer NF instances for which the claim is applicable. If a service producer NF that receives this IE in the token included in the authorization header does not understand this IE, it shall be ignored. |
| producerPlmnId | PlmnId | C | 0 . . . 1 | Included if the NRF supports providing PLMN ID of the service producer NF in the access token claims, to be interpretted for audience (aud IE), as specified in clause 13.4.1.2 of 3GPP TS 33.501 [15]. If a service producer NF that receives this IE in the token included in the authorization header does not understand this IE, it shall be ignored. |
| producerSnssaiList | array(Snssai) | O | 1 . . . N | Included if the NRF supports providing list of S-NSSAIs of the service producer NF in the access token claims. If a service producer NF that receives this IE in the token included in the authorization header does not understand this IE, it shall be ignored. |
| producerNsiList | array(string) | O | 1 . . . N | Included if the NRF supports providing list of NSIs of the service producer NF in the access token claims. If a service producer NF that receives this IE in the token included in the authorization header does not understand this IE, it shall be ignored. |
| producerNfSetId | NfSetId | O | 0 . . . 1 | Included if the NRF supports providing NF Set ID of the service producer NF in the access token claims and if the audience contains an NF type. When present, it shall indicate the NF Set ID of the service producer NF instances for which the claim is applicable. If a service producer NF that receives this IE in the token included in the authorization header does not understand this IE, it shall be ignored. |

If the authorization is successful in operation 2, in operation 3 the NRF sends the access token with the above information to the service consumer NF using Nnrf_AccessToken_GetResponse. The other parameters (e.g., expiration time, allowed scope) sent by NRF in addition to the access token are described in 3GPP TS 29.510. If the authorization is unsuccessful in operation 2, the NRF replies in operation 3 based on OAuth 2.0 error response defined in RFC 6749 published by IETF.

The service consumer NF then sends the received access token to the service producer NF in the subscription request, such as illustrated in FIGS. 3-5 discussed above. In the direct communication scenarios illustrated in FIGS. 3-4, when the notification endpoint included in the subscription is not reachable, the Binding Indication received is used to discover an alternative notification endpoint. When consumer NF Set information is available in the access token, the service producer NF verifies that the newly selected alternative notification receiver is within the consumer NF Set lists embedded in the access token as discussed above.

In the indirect communication scenario illustrated in FIG. 5, when the consumer NF Set list is embedded in the access token, the service producer NF verifies the NF Set in the Binding Indication against the embedded consumer NF Set list. Based on a successful verification, the service producer NF includes the notification endpoint received in the subscription and may include a Routing Binding Indication with the same contents as the received Binding Indication. If the notification endpoint included in the subscription is not reachable, the SCP selects the target for the related notifications using the received Routing Binding Indication.

Figure 7:
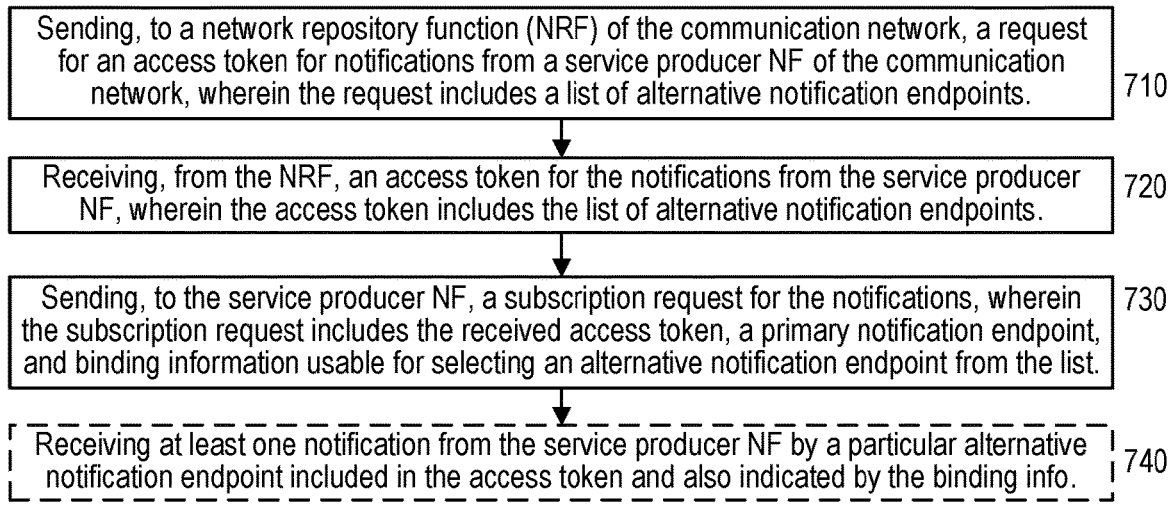
FIG. 7 shows an exemplary method (e.g., procedure) for a service consumer NF of a communication network, according to various embodiments of the present disclosure.
Figure 8:
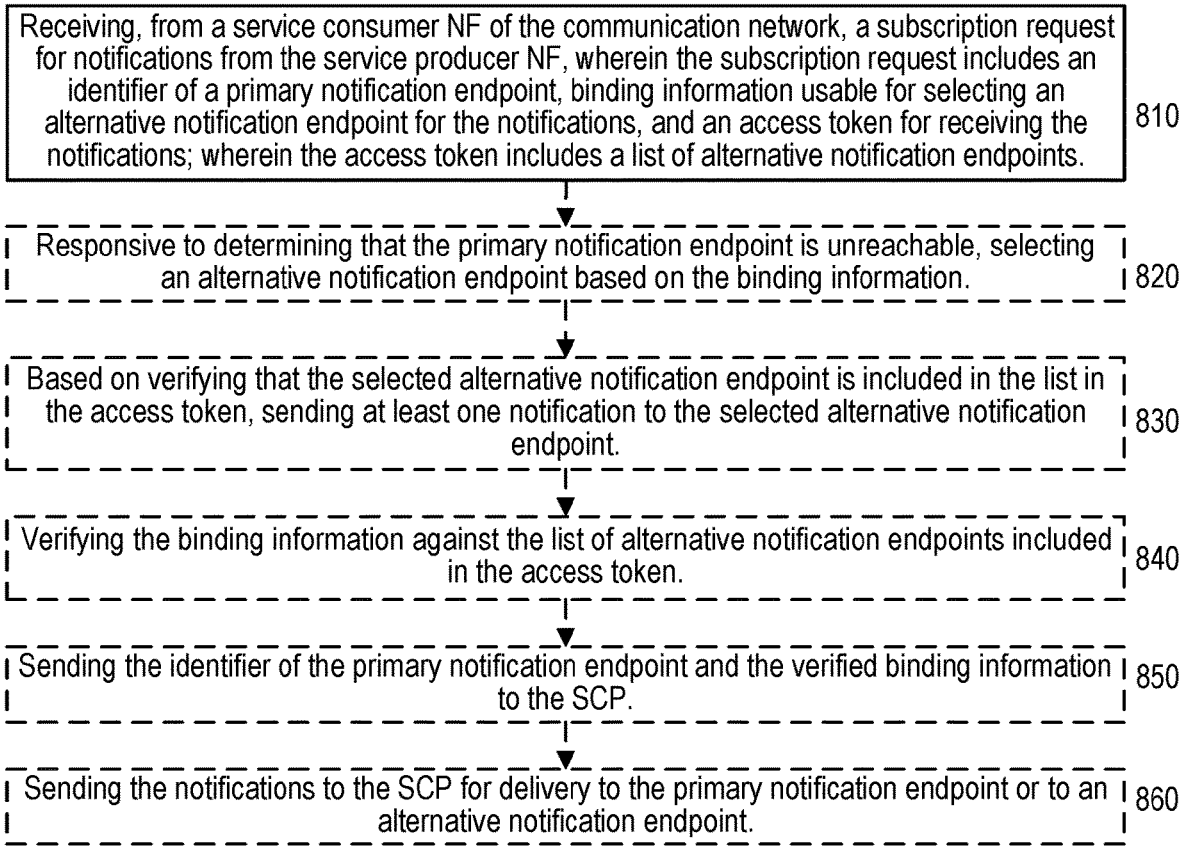
FIG. 8 shows an exemplary method (e.g., procedure) for a service producer NF of a communication network, according to various embodiments of the present disclosure.
Figure 9:
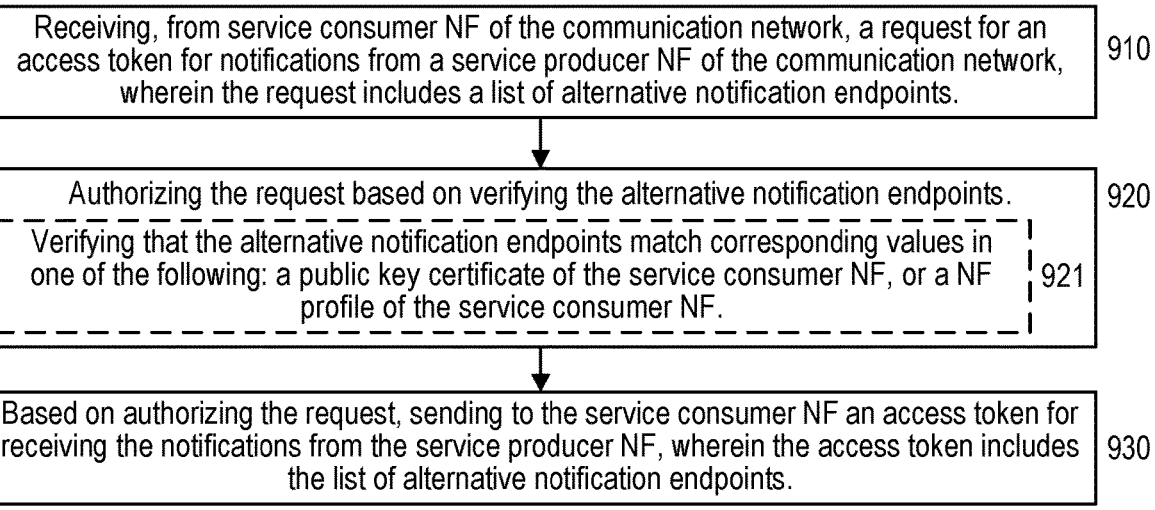
FIG. 9 shows an exemplary method (e.g., procedure) for an NRF of a communication network, according to various embodiments of the present disclosure.

The embodiments described above can be further illustrated with reference to FIGS. 7-9, which depict exemplary methods (e.g., procedures) for a service consumer NF, a service producer NF, and an NRF, respectively. Put differently, various features of the operations described below correspond to various embodiments described above. The exemplary methods shown in FIGS. 7-9 can be used cooperatively (e.g., with each other and with other procedures described herein) to provide benefits, advantages, and/or solutions to problems described herein. Although the exemplary methods are illustrated in FIGS. 7-9 by specific blocks in particular orders, the operations corresponding to the blocks can be performed in different orders than shown and can be combined and/or divided into blocks and/or operations having different functionality than shown. Optional blocks and/or operations are indicated by dashed lines.

More specifically, FIG. 7 illustrates an exemplary method (e.g., procedure) for a service consumer NF of a communication network (e.g., 5GC), according to various embodiments of the present disclosure. The exemplary method shown in FIG. 7 can be performed by various NFs (or network nodes hosting the same) such as described elsewhere herein.

The exemplary method can include the operations of block 710, where the service consumer NF can send, to an NRF of the communication network, a request for an access token for notifications from a service producer NF of the communication network. The request includes a list of alternative notification endpoints, i.e., for receiving notifications. The exemplary method can also include the operations of block 720, where the service consumer NF can receive, from the NRF, an access token for the notifications from the service producer NF. The access token includes the list of alternative notification endpoints. The exemplary method can also include the operations of block 730, where the service consumer NF can send, to the service producer NF, a subscription request for the notifications. The subscription request includes the received access token, a primary notification endpoint, and binding information usable for selecting an alternative notification endpoint from the list.

In some embodiments, the exemplary method can also include the operations of block 740, where the service consumer NF can receive at least one notification from the service producer NF via an alternative notification endpoint that is included in the access token and is also indicated by the binding information. In some of these embodiments, the subscription request is sent to the service producer NF (e.g., in block 730) via an SCP and the at least one notification is received via the alternative notification endpoint and the SCP.

In other embodiments, the request for the access token and the subscription request are on behalf of a second service consumer NF of the communication network, and the list of alternative notification endpoints is associated with the second service consumer NF. FIG. 4 described above is an example of these embodiments.

In some embodiments, the list of alternative notification endpoints is included in an AccessTokenClaims field of the access token. In some of these embodiments, the list of alternative notification endpoints comprises a list of NF Set identifiers (IDs) of service consumer NFs that are alternative notification endpoints for which the AccessTokenClaims field is applicable. Table 1 above is an example of these embodiments.

In addition, FIG. 8 illustrates an exemplary method (e.g., procedure) for a service producer NF of a communication network (e.g., 5GC), according to various embodiments of the present disclosure. The exemplary method shown in FIG. 8 can be performed by various NFs (or network nodes hosting the same) such as described elsewhere herein.

The exemplary method can include the operations of block 810, where the service producer NF can receive, from a service consumer NF of the communication network, a subscription request for notifications from the service producer NF. The subscription request can include an identifier of a primary notification endpoint, binding information usable for selecting an alternative notification endpoint for the notifications, and an access token for receiving the notifications. The access token includes a list of alternative notification endpoints.

In some embodiments, the subscription request is on behalf of a second service consumer NF of the communication network and the list of alternative notification endpoints is associated with the second service consumer NF.

In some embodiments, the exemplary method can also include the operations of blocks 820-830. In block 820, based on determining that the primary notification endpoint is unavailable, the service producer NF can select an alternative notification endpoint based on the binding information. In block 830, based on verifying that the selected alternative notification endpoint is included in the access token, the service producer NF can send at least one notification to the selected alternative notification endpoint.

In other embodiments, the exemplary method can also include the operations of blocks 840-860. In blocks 840-850, the service producer NF can verify the binding information against the list of alternative notification endpoints included in the access token and send the identifier of the primary notification endpoint and the verified binding information to the SCP. In block 860, the service producer NF can send the notifications to the SCP for delivery to the primary notification endpoint or an alternative notification endpoint, i.e., a verified alternative notification endpoint indicated by the binding information and the access token.

In some embodiments, the list of alternative notification endpoints is included in an AccessTokenClaims field of the access token. In some of these embodiments, the list of alternative notification endpoints comprises a list of NF Set IDs of service consumer NF s that are alternative notification endpoints for which the AccessTokenClaims field is applicable. Table 1 above is an example of these embodiments.

In addition, FIG. 9 illustrates an exemplary method (e.g., procedure) for an NRF of a communication network (e.g., 5GC), according to various embodiments of the present disclosure. The exemplary method shown in FIG. 9 can be performed by an NRF (or network node hosting the same) such as described elsewhere herein.

The exemplary method can include the operations of block 910, where the NRF can receive, from a service consumer NF of the communication network, a request for an access token for notifications from a service producer NF of the communication network. The request can include a list of alternative notification endpoints. The exemplary method can also include the operations of block 920, where the NRF can authorize the request based on verifying the alternative notification endpoints. The exemplary method can also include the operations of block 930, where based on authorizing the request, the NRF can send to the service consumer NF an access token for receiving the notifications from the service producer NF. The access token includes the list of alternative notification endpoints.

In some embodiments, authorizing the request in block 920 can include the operations of sub-block 921, where the NRF can verify that the alternative notification endpoints match corresponding values in one of the following: a public key certificate of the service consumer NF, or a NF profile of the service consumer NF.

In some embodiments, the request for the access token is on behalf of a second service consumer NF of the communication network and the list of alternative notification endpoints is associated with the second service consumer NF.

In some embodiments, the list of alternative notification endpoints is included in an AccessTokenClaims field of the access token. In some of these embodiments, the list of alternative notification endpoints comprises a list of NF Set IDs of service consumer NF s that are alternative notification endpoints for which the AccessTokenClaims field is applicable. Table 1 above is an example of these embodiments.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 10:
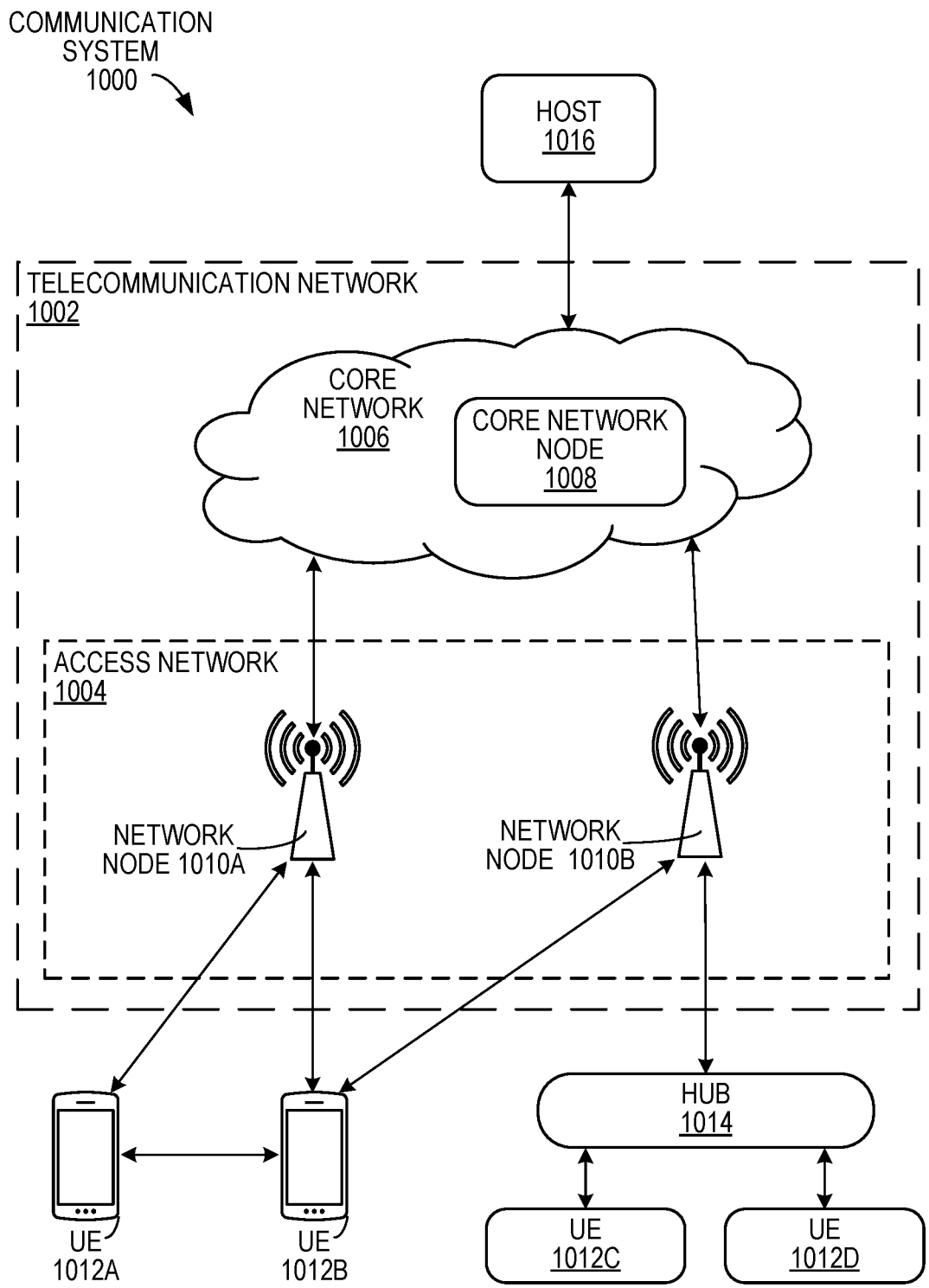
FIG. 10 shows a communication system according to various embodiments of the present disclosure.

FIG. 10 shows an example of a communication system 1000 in accordance with some embodiments. In this example, the communication system 1000 includes a telecommunication network 1002 that includes an access network 1004, such as a radio access network (RAN), and a core network 1006, which includes one or more core network nodes 1008. The access network 1004 includes one or more access network nodes, such as network nodes 1010a and 1010b (one or more of which may be generally referred to as network nodes 1010), or any other similar 3GPP access node or non-3GPP access point. The network nodes 1010 facilitate direct or indirect connection of user equipment (UE), such as by connecting UEs 1012a, 1012b, 1012c, and 1012d (one or more of which may be generally referred to as UEs 1012) to the core network 1006 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1000 may include any number of wired or wireless networks, network nodes, UEs, and/or any other components or systems that may facilitate or participate in the communication of data and/or signals whether via wired or wireless connections. The communication system 1000 may include and/or interface with any type of communication, telecommunication, data, cellular, radio network, and/or other similar type of system.

The UEs 1012 may be any of a wide variety of communication devices, including wireless devices arranged, configured, and/or operable to communicate wirelessly with the network nodes 1010 and other communication devices. Similarly, the network nodes 1010 are arranged, capable, configured, and/or operable to communicate directly or indirectly with the UEs 1012 and/or with other network nodes or equipment in the telecommunication network 1002 to enable and/or provide network access, such as wireless network access, and/or to perform other functions, such as administration in the telecommunication network 1002.

In the depicted example, the core network 1006 connects the network nodes 1010 to one or more hosts, such as host 1016. These connections may be direct or indirect via one or more intermediary networks or devices. In other examples, network nodes may be directly coupled to hosts. The core network 1006 includes one more core network nodes (e.g., core network node 1008) that are structured with hardware and software components. Features of these components may be substantially similar to those described with respect to the UEs, network nodes, and/or hosts, such that the descriptions thereof are generally applicable to the corresponding components of the core network node 1008.

Example core network nodes (or functions implemented by such nodes) include one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), Network Repository Function (NRF), and/or a User Plane Function (UPF). At least some of these functions can be service consumer NFs and/or service producer NFs such as described elsewhere herein. In some embodiments, different instances of core network node 1108 can perform operations corresponding to exemplary methods or procedures described above as being performed by a service consumer NF, a service consumer NF, and an NRF.

The host 1016 may be under the ownership or control of a service provider other than an operator or provider of the access network 1004 and/or the telecommunication network 1002 and may be operated by the service provider or on behalf of the service provider. The host 1016 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1000 of FIG. 10 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/ or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1002 is a cellular network that implements 3GPP standardized features. Accordingly, the telecommunications network 1002 may support network slicing to provide different logical networks to different devices that are connected to the telecommunication network 1002. For example, the telecommunications network 1002 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1012 are configured to transmit and/or receive information without direct human interaction. For instance, a UE may be designed to transmit information to the access network 1004 on a predetermined schedule, when triggered by an internal or external event, or in response to requests from the access network 1004. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1014 communicates with the access network 1004 to facilitate indirect communication between one or more UEs (e.g., UE 1012*c* and/or 1012*d*) and network nodes (e.g., network node 1010*b*). In some examples, the hub 1014 may be a controller, router, content source and analytics, or any of the other communication devices described herein regarding UEs. For example, the hub 1014 may be a broadband router enabling access to the core network 1006 for the UEs. As another example, the hub 1014 may be a controller that sends commands or instructions to one or more actuators in the UEs. Commands or instructions may be received from the UEs, network nodes 1010, or by executable code, script, process, or other instructions in the hub 1014. As another example, the hub 1014 may be a data collector that acts as temporary storage for UE data and, in some embodiments, may perform analysis or other processing of the data. As another example, the hub 1014 may be a content source. For example, for a UE that is a VR headset, display, loudspeaker or other media delivery device, the hub 1014 may retrieve VR assets, video, audio, or other media or data related to sensory information via a network node, which the hub 1014 then provides to the UE either directly, after performing local processing, and/or after adding additional local content. In still another example, the hub 1014 acts as a proxy server or orchestrator for the UEs, in particular in if one or more of the UEs are low energy IoT devices.

The hub 1014 may have a constant/persistent or intermittent connection to the network node 1010*b*. The hub 1014 may also allow for a different communication scheme and/or schedule between the hub 1014 and UEs (e.g., UE 1012*c* and/or 1012*d*), and between the hub 1014 and the core network 1006. In other examples, the hub 1014 is connected to the core network 1006 and/or one or more UEs via a wired connection. Moreover, the hub 1014 may be configured to connect to an M2M service provider over the access network 1004 and/or to another UE over a direct connection. In some scenarios, UEs may establish a wireless connection with the network nodes 1010 while still connected via the hub 1014 via a wired or wireless connection. In some embodiments, the hub 1014 may be a dedicated hub—that is, a hub whose primary function is to route communications to/from the UEs from/to the network node 1010*b*. In other embodiments, the hub 1014 may be a non-dedicated hub—that is, a device which is capable of operating to route communications between the UEs and network node 1010*b*, but which is additionally capable of operating as a communication start and/or end point for certain data channels.

Figure 11:
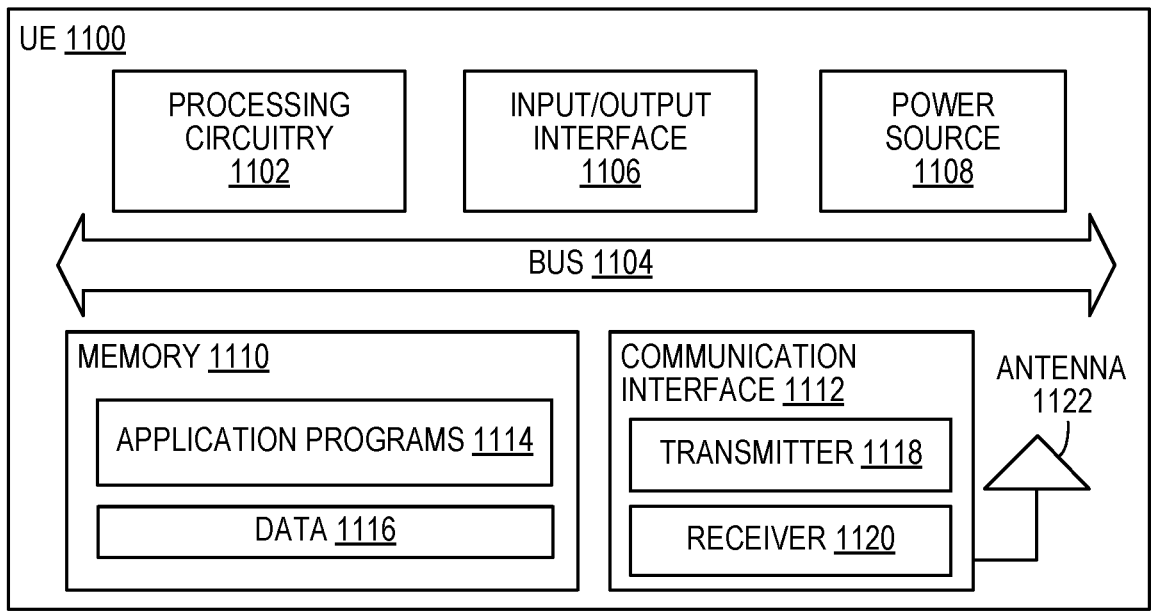
FIG. 11 shows a UE according to various embodiments of the present disclosure.

FIG. 11 shows a UE 1100 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1100 includes processing circuitry 1102 that is operatively coupled via a bus 1104 to an input/output interface 1106, a power source 1108, a memory 1110, a communication interface 1112, and/or any other component, or any combination thereof. Certain UEs may utilize all or a subset of the components shown in FIG. 11. The level of integration between the components may vary from one UE to another UE. Further, certain UEs may contain multiple instances of a component, such as multiple processors, memories, transceivers, transmitters, receivers, etc.

The processing circuitry 1102 is configured to process instructions and data and may be configured to implement any sequential state machine operative to execute instructions stored as machine-readable computer programs in the memory 1110. The processing circuitry 1102 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1102 may include multiple central processing units (CPUs).

In the example, the input/output interface 1106 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1100. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1108 is structured as a battery or battery pack. Other types of power sources, such as an external power source (e.g., an electricity outlet), photovoltaic device, or power cell, may be used. The power source 1108 may further include power circuitry for delivering power from the power source 1108 itself, and/or an external power source, to the various parts of the UE 1100 via input circuitry or an interface such as an electrical power cable. Delivering power may be, for example, for charging of the power source 1108. Power circuitry may perform any formatting, converting, or other modification to the power from the power source 1108 to make the power suitable for the respective components of the UE 1100 to which power is supplied.

The memory 1110 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1110 includes one or more application programs 1114, such as an operating system, web browser application, a widget, gadget engine, or other application, and corresponding data 1116. The memory 1110 may store, for use by the UE 1100, any of a variety of various operating systems or combinations of operating systems.

The memory 1110 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1110 may allow the UE 1100 to access instructions, application programs and the like, stored on transitory or non-transitory memory media, to off-load data, or to upload data. An article of manufacture, such as one utilizing a communication system may be tangibly embodied as or in the memory 1110, which may be or comprise a device-readable storage medium.

The processing circuitry 1102 may be configured to communicate with an access network or other network using the communication interface 1112. The communication interface 1112 may comprise one or more communication subsystems and may include or be communicatively coupled to an antenna 1122. The communication interface 1112 may include one or more transceivers used to communicate, such as by communicating with one or more remote transceivers of another device capable of wireless communication (e.g., another UE or a network node in an access network). Each transceiver may include a transmitter 1118 and/or a receiver 1120 appropriate to provide network communications (e.g., optical, electrical, frequency allocations, and so forth). Moreover, the transmitter 1118 and receiver 1120 may be coupled to one or more antennas (e.g., antenna 1122) and may share circuit components, software or firmware, or alternatively be implemented separately.

In the illustrated embodiment, communication functions of the communication interface 1112 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1112, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected, an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1100 shown in FIG. 11.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 12:
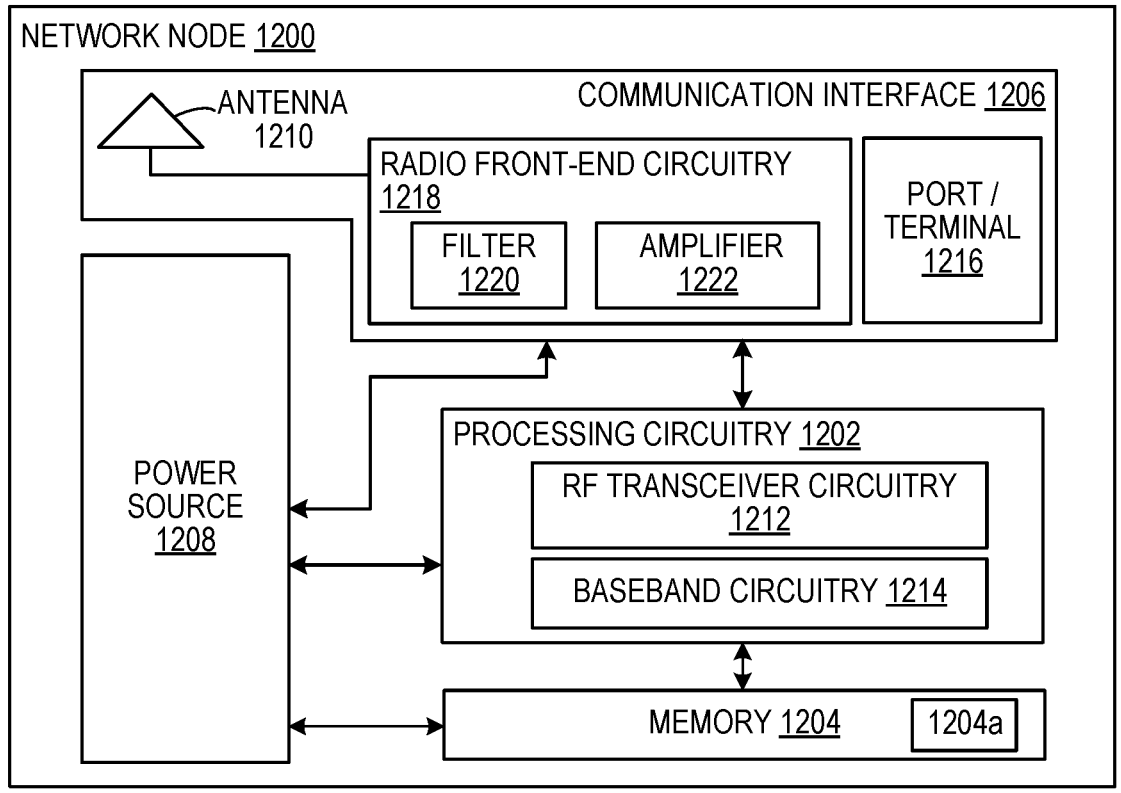
FIG. 12 shows a network node according to various embodiments of the present disclosure.

FIG. 12 shows a network node 1200 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1200 includes a processing circuitry 1202, a memory 1204, a communication interface 1206, and a power source 1208. The network node 1200 may be composed of multiple physically separate components (e.g., a NodeB component and a RNC component, or a BTS component and a BSC component, etc.), which may each have their own respective components. In certain scenarios in which the network node 1200 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1200 may be configured to support multiple radio access technologies (RATs). In such embodiments, some components may be duplicated (e.g., separate memory 1204 for different RATs) and some components may be reused (e.g., a same antenna 1210 may be shared by different RATs). The network node 1200 may also include multiple sets of the various illustrated components for different wireless technologies integrated into network node 1200, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1200.

The processing circuitry 1202 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1200 components, such as the memory 1204, to provide network node 1200 functionality.

In some embodiments, the processing circuitry 1202 includes a system on a chip (SOC). In some embodiments, the processing circuitry 1202 includes one or more of radio frequency (RF) transceiver circuitry 1212 and baseband processing circuitry 1214. In some embodiments, the radio frequency (RF) transceiver circuitry 1212 and the baseband processing circuitry 1214 may be on separate chips (or sets of chips), boards, or units, such as radio units and digital units. In alternative embodiments, part or all of RF transceiver circuitry 1212 and baseband processing circuitry 1214 may be on the same chip or set of chips, boards, or units.

The memory 1204 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1202. The memory 1204 may store any suitable instructions, data, or information, including a computer program, software, an application including one or more of logic, rules, code, tables, and/or other instructions (collectively referred to as computer program product 1204*a*) capable of being executed by the processing circuitry 1202 and utilized by the network node 1200. The memory 1204 may be used to store any calculations made by the processing circuitry 1202 and/or any data received via the communication interface 1206. In some embodiments, processing circuitry 1202 and memory 1204 can be integrated.

The communication interface 1206 is used in wired or wireless communication of signaling and/or data between a network node, access network, and/or UE. As illustrated, the communication interface 1206 comprises port(s)/terminal(s) 1216 to send and receive data, for example to and from a network over a wired connection. The communication interface 1206 also includes radio front-end circuitry 1218 that may be coupled to, or in certain embodiments a part of, the antenna 1210. Radio front-end circuitry 1218 comprises filters 1220 and amplifiers 1222. The radio front-end circuitry 1218 may be connected to an antenna 1210 and processing circuitry 1202. The radio front-end circuitry may be configured to condition signals communicated between antenna 1210 and processing circuitry 1202. The radio front-end circuitry 1218 may receive digital data that is to be sent out to other network nodes or UEs via a wireless connection. The radio front-end circuitry 1218 may convert the digital data into a radio signal having the appropriate channel and bandwidth parameters using a combination of filters 1220 and/or amplifiers 1222. The radio signal may then be transmitted via the antenna 1210. Similarly, when receiving data, the antenna 1210 may collect radio signals which are then converted into digital data by the radio front-end circuitry 1218. The digital data may be passed to the processing circuitry 1202. In other embodiments, the communication interface may comprise different components and/or different combinations of components.

In certain alternative embodiments, the network node 1200 does not include separate radio front-end circuitry 1218, instead, the processing circuitry 1202 includes radio front-end circuitry and is connected to the antenna 1210. Similarly, in some embodiments, all or some of the RF transceiver circuitry 1212 is part of the communication interface 1206. In still other embodiments, the communication interface 1206 includes one or more ports or terminals 1216, the radio front-end circuitry 1218, and the RF transceiver circuitry 1212, as part of a radio unit (not shown), and the communication interface 1206 communicates with the baseband processing circuitry 1214, which is part of a digital unit (not shown).

The antenna 1210 may include one or more antennas, or antenna arrays, configured to send and/or receive wireless signals. The antenna 1210 may be coupled to the radio front-end circuitry 1218 and may be any type of antenna capable of transmitting and receiving data and/or signals wirelessly. In certain embodiments, the antenna 1210 is separate from the network node 1200 and connectable to the network node 1200 through an interface or port.

The antenna 1210, communication interface 1206, and/or the processing circuitry 1202 may be configured to perform any receiving operations and/or certain obtaining operations described herein as being performed by the network node. Any information, data and/or signals may be received from a UE, another network node and/or any other network equipment. Similarly, the antenna 1210, the communication interface 1206, and/or the processing circuitry 1202 may be configured to perform any transmitting operations described herein as being performed by the network node. Any information, data and/or signals may be transmitted to a UE, another network node and/or any other network equipment.

The power source 1208 provides power to the various components of network node 1200 in a form suitable for the respective components (e.g., at a voltage and current level needed for each respective component). The power source 1208 may further comprise, or be coupled to, power management circuitry to supply the components of the network node 1200 with power for performing the functionality described herein. For example, the network node 1200 may be connectable to an external power source (e.g., the power grid, an electricity outlet) via an input circuitry or interface such as an electrical cable, whereby the external power source supplies power to power circuitry of the power source 1208. As a further example, the power source 1208 may comprise a source of power in the form of a battery or battery pack which is connected to, or integrated in, power circuitry. The battery may provide backup power should the external power source fail.

Embodiments of the network node 1200 may include additional components beyond those shown in FIG. 12 for providing certain aspects of the network node's functionality, including any of the functionality described herein and/or any functionality necessary to support the subject matter described herein. For example, the network node 1200 may include user interface equipment to allow input of information into the network node 1200 and to allow output of information from the network node 1200. This may allow a user to perform diagnostic, maintenance, repair, and other administrative functions for the network node 1200.

In some embodiments, In some embodiments, different instances of network node 1200 (e.g., processing circuitry 1202 and communication interface circuitry 1206) can be configured to perform operations corresponding to exemplary methods or procedures described above as being performed by a service consumer NF, a service consumer NF, and an NRF.

Figure 13:
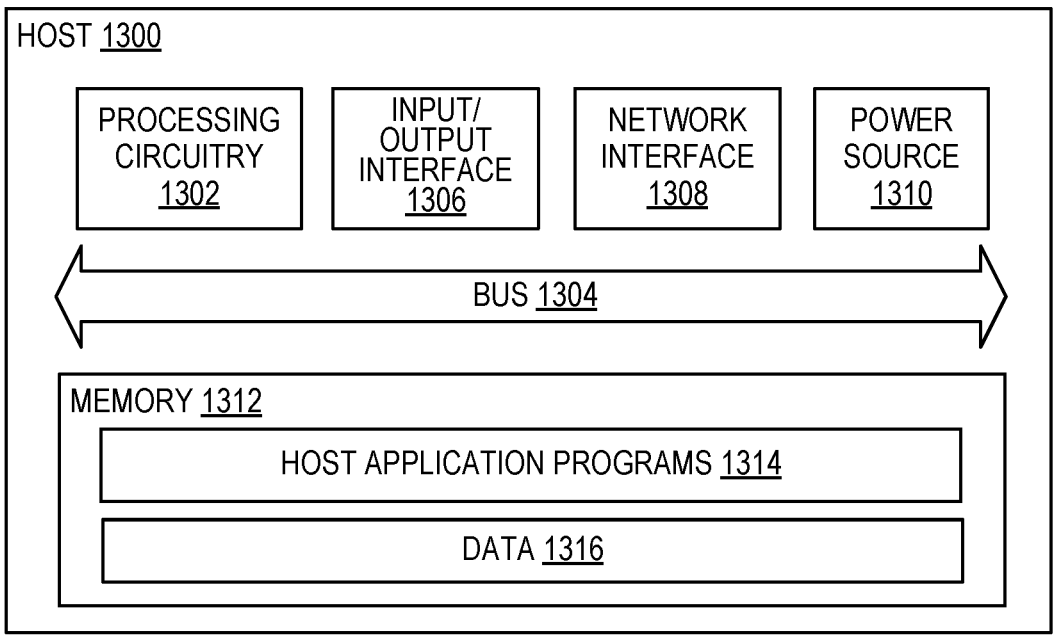
FIG. 13 shows host computing system according to various embodiments of the present disclosure.

FIG. 13 is a block diagram of a host 1300, which may be an embodiment of the host 1016 of FIG. 10, in accordance with various aspects described herein. As used herein, the host 1300 may be or comprise various combinations hardware and/or software, including a standalone server, a blade server, a cloud-implemented server, a distributed server, a virtual machine, container, or processing resources in a server farm. The host 1300 may provide one or more services to one or more UEs.

The host 1300 includes processing circuitry 1302 that is operatively coupled via a bus 1304 to an input/output interface 1306, a network interface 1308, a power source 1310, and a memory 1312. Other components may be included in other embodiments. Features of these components may be substantially similar to those described with respect to the devices of previous figures, such as FIGS. 11 and 12, such that the descriptions thereof are generally applicable to the corresponding components of host 1300.

The memory 1312 may include one or more computer programs including one or more host application programs 1314 and data 1316, which may include user data, e.g., data generated by a UE for the host 1300 or data generated by the host 1300 for a UE. Embodiments of the host 1300 may utilize only a subset or all of the components shown. The host application programs 1314 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1314 may also provide for user authentication and licensing checks and may periodically report health, routes, and content availability to a central node, such as a device in or on the edge of a core network. Accordingly, the host 1300 may select and/or indicate a different host for over-the-top services for a UE. The host application programs 1314 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 14:
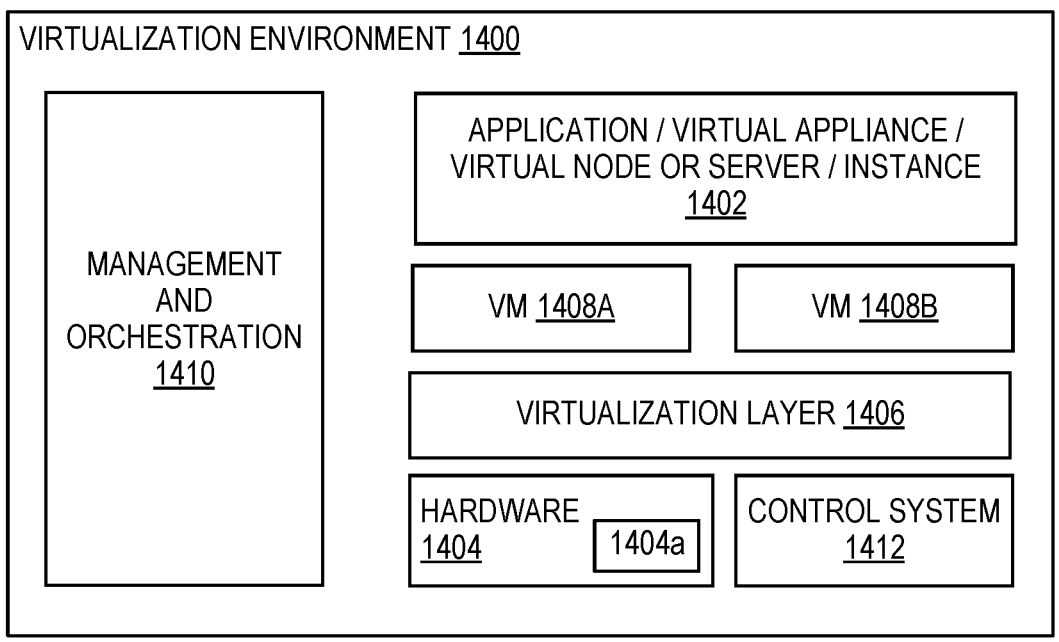
FIG. 14 is a block diagram of a virtualization environment in which functions implemented by some embodiments of the present disclosure may be virtualized.

FIG. 14 is a block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1400 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1402 (which may alternatively be called software instances, virtual appliances, network functions, virtual nodes, virtual network functions, etc.) are run in the virtualization environment 1400 to implement some of the features, functions, and/or benefits of some of the embodiments disclosed herein. As a specific example, a service consumer NF, a service producer NF, and/or an NRF performing the respective methods or procedures described above can be instantiated as one or more applications 1402 running in virtualization environment 1400.

Hardware 1404 includes processing circuitry, memory that stores software and/or instructions (designated as computer program product 1404a) executable by hardware processing circuitry, and/or other hardware devices as described herein, such as a network (or communication) interface, input/output interface, and so forth. Software may be executed by the processing circuitry to instantiate one or more virtualization layers 1406 (also referred to as hypervisors or virtual machine monitors (VMMs)), provide VMs 1408a and 1408b (one or more of which may be generally referred to as VMs 1408), and/or perform any of the functions, features and/or benefits described in relation with some embodiments described herein. The virtualization layer 1406 may present a virtual operating platform that appears like networking hardware to the VMs 1408.

The VMs 1408 comprise virtual processing, virtual memory, virtual networking or interface and virtual storage, and may be run by a corresponding virtualization layer 1406. Different embodiments of the instance of a virtual appliance 1402 may be implemented on one or more of VMs 1408, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1408 may be a software implementation of a physical machine that runs programs as if they were executing on a physical, non-virtualized machine. Each of the VMs 1408, and that part of hardware 1404 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1408 on top of the hardware 1404 and corresponds to the application 1402.

Hardware 1404 may be implemented in a standalone network node with generic or specific components. Hardware 1404 may implement some functions via virtualization. Alternatively, hardware 1404 may be part of a larger cluster of hardware (e.g., such as in a data center or CPE) where many hardware nodes work together and are managed via management and orchestration 1410, which, among others, oversees lifecycle management of applications 1402. In some embodiments, hardware 1404 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1412 which may alternatively be used for communication between hardware nodes and radio units.

Figure 15:
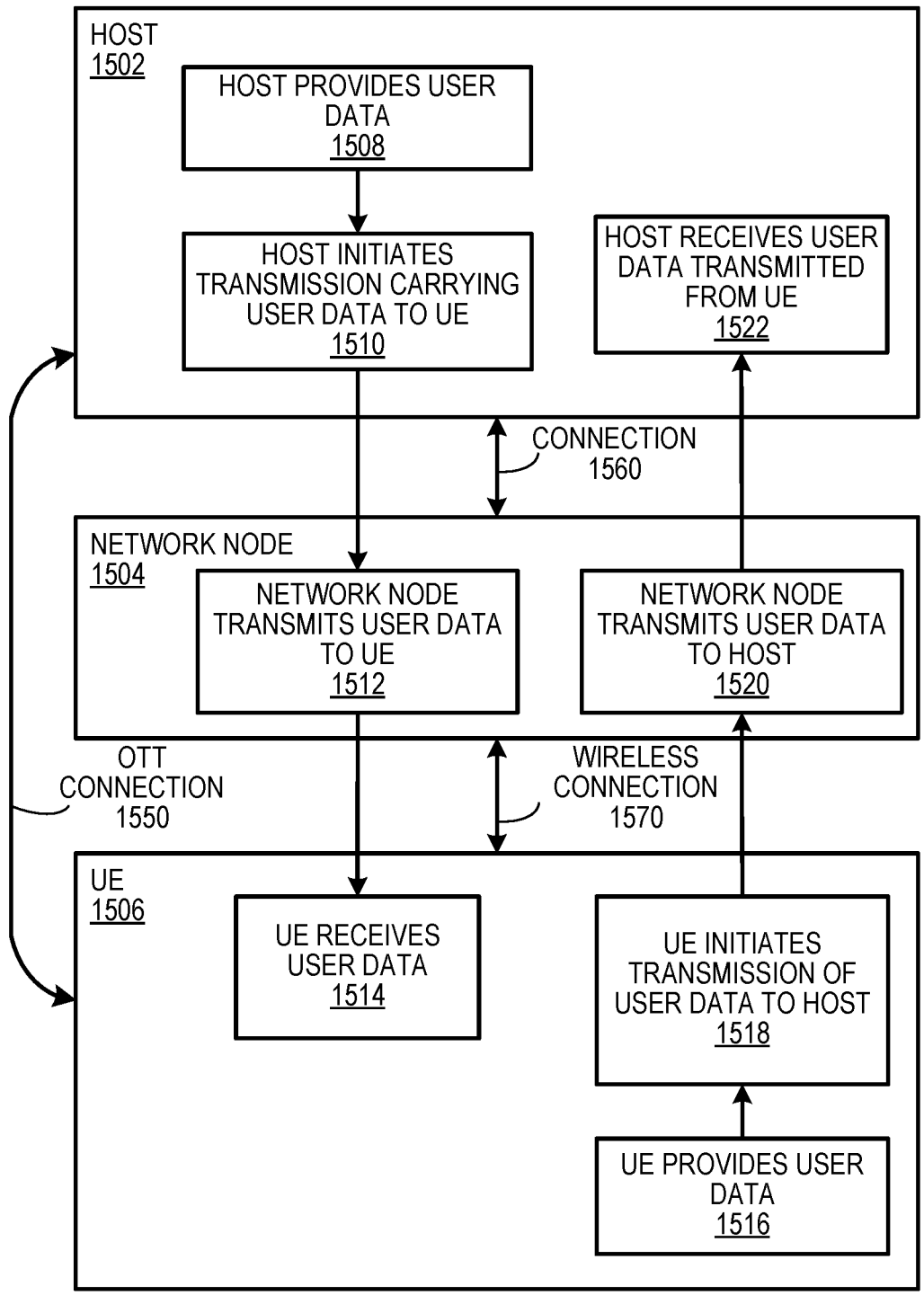
FIG. 15 illustrates communication between a host computing system, a network node, and a UE via multiple connections, according to various embodiments of the present disclosure.

FIG. 15 shows a communication diagram of a host 1502 communicating via a network node 1504 with a UE 1506 over a partially wireless connection in accordance with some embodiments. Example implementations, in accordance with various embodiments, of the UE (such as a UE 1012a of FIG. 10 and/or UE 1100 of FIG. 11), network node (such as network node 1010a of FIG. 10 and/or network node 1200 of FIG. 12), and host (such as host 1016 of FIG. 10 and/or host 1300 of FIG. 13) discussed in the preceding paragraphs will now be described with reference to FIG. 15.

Like host 1300, embodiments of host 1502 include hardware, such as a communication interface, processing circuitry, and memory. The host 1502 also includes software, which is stored in or accessible by the host 1502 and executable by the processing circuitry. The software includes a host application that may be operable to provide a service to a remote user, such as the UE 1506 connecting via an over-the-top (OTT) connection 1550 extending between the UE 1506 and host 1502. In providing the service to the remote user, a host application may provide user data which is transmitted using the OTT connection 1550.

The network node 1504 includes hardware enabling it to communicate with the host 1502 and UE 1506. The connection 1560 may be direct or pass through a core network (like core network 1006 of FIG. 10) and/or one or more other intermediate networks, such as one or more public, private, or hosted networks. For example, an intermediate network may be a backbone network or the Internet.

The UE 1506 includes hardware and software, which is stored in or accessible by UE 1506 and executable by the UE's processing circuitry. The software includes a client application, such as a web browser or operator-specific "app" that may be operable to provide a service to a human or non-human user via UE 1506 with the support of the host 1502. In the host 1502, an executing host application may communicate with the executing client application via the OTT connection 1550 terminating at the UE 1506 and host 1502. In providing the service to the user, the UE's client application may receive request data from the host's host application and provide user data in response to the request data. The OTT connection 1550 may transfer both the request data and the user data. The UE's client application may interact with the user to generate the user data that it provides to the host application through the OTT connection 1550.

The OTT connection 1550 may extend via a connection 1560 between the host 1502 and the network node 1504 and via a wireless connection 1570 between the network node 1504 and the UE 1506 to provide the connection between the host 1502 and the UE 1506. The connection 1560 and wireless connection 1570, over which the OTT connection 1550 may be provided, have been drawn abstractly to illustrate the communication between the host 1502 and the UE 1506 via the network node 1504, without explicit reference to any intermediary devices and the precise routing of messages via these devices.

As an example of transmitting data via the OTT connection 1550, in step 1508, the host 1502 provides user data, which may be performed by executing a host application. In some embodiments, the user data is associated with a particular human user interacting with the UE 1506. In other embodiments, the user data is associated with a UE 1506 that shares data with the host 1502 without explicit human interaction. In step 1510, the host 1502 initiates a transmission carrying the user data towards the UE 1506. The host 1502 may initiate the transmission responsive to a request transmitted by the UE 1506. The request may be caused by human interaction with the UE 1506 or by operation of the client application executing on the UE 1506. The transmission may pass via the network node 1504, in accordance with the teachings of the embodiments described throughout this disclosure. Accordingly, in step 1512, the network node 1504 transmits to the UE 1506 the user data that was carried in the transmission that the host 1502 initiated, in accordance with the teachings of the embodiments described throughout this disclosure. In step 1514, the UE 1506 receives the user data carried in the transmission, which may be performed by a client application executed on the UE 1506 associated with the host application executed by the host 1502.

In some examples, the UE 1506 executes a client application which provides user data to the host 1502. The user data may be provided in reaction or response to the data received from the host 1502. Accordingly, in step 1516, the UE 1506 may provide user data, which may be performed by executing the client application. In providing the user data, the client application may further consider user input received from the user via an input/output interface of the UE 1506. Regardless of the specific manner in which the user data was provided, the UE 1506 initiates, in step 1518, transmission of the user data towards the host 1502 via the network node 1504. In step 1520, in accordance with the teachings of the embodiments described throughout this disclosure, the network node 1504 receives user data from the UE 1506 and initiates transmission of the received user data towards the host 1502. In step 1522, the host 1502 receives the user data carried in the transmission initiated by the UE 1506.

One or more of the various embodiments improve the performance of OTT services provided to the UE 1506 using the OTT connection 1550, in which the wireless connection 1570 forms the last segment. More precisely, embodiments of the present disclosure can improve security in a communication network by an access token that indicates an expected consumer NF Set that is authorized by the network (e.g., NRF) to receive notifications a service producer NF. This information in the access token can be used by the service producer NF to ensure that it sends notification messages to authorized notification receivers. This can improve security of the network (e.g., 5G SBA) by mitigating various attack scenarios. Providing a more secure network for delivering OTT services increases the values of the OTT services to both end users and service providers.

In an example scenario, factory status information may be collected and analyzed by the host 1502. As another example, the host 1502 may process audio and video data which may have been retrieved from a UE for use in creating maps. As another example, the host 1502 may collect and analyze real-time data to assist in controlling vehicle congestion (e.g., controlling traffic lights). As another example, the host 1502 may store surveillance video uploaded by a UE. As another example, the host 1502 may store or control access to media content such as video, audio, VR or AR which it can broadcast, multicast or unicast to UEs. As other examples, the host 1502 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1550 between the host 1502 and UE 1506, in response to variations in the measurement results. The measurement procedure and/or the network functionality for reconfiguring the OTT connection may be implemented in software and hardware of the host 1502 and/or UE 1506. In some embodiments, sensors (not shown) may be deployed in or in association with other devices through which the OTT connection 1550 passes; the sensors may participate in the measurement procedure by supplying values of the monitored quantities exemplified above or supplying values of other physical quantities from which software may compute or estimate the monitored quantities. The reconfiguring of the OTT connection 1550 may include message format, retransmission settings, preferred routing etc.; the reconfiguring need not directly alter the operation of the network node 1504. Such procedures and functionalities may be known and practiced in the art. In certain embodiments, measurements may involve proprietary UE signaling that facilitates measurements of throughput, propagation times, latency and the like, by the host 1502. The measurements may be implemented in that software causes messages to be transmitted, in particular empty or 'dummy' messages, using the OTT connection 1550 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method performed by a service consumer network function (NF) of a communication network, the method comprising:
    sending, to a network repository function (NRF) of the communication network, a request for an access token for notifications from a service producer NF of the communication network, wherein the request includes a list of alternative notification endpoints;
    receiving, from the NRF, an access token for the notifications from the service producer NF, wherein the access token includes the list of alternative notification endpoints; and
    sending, to the service producer NF, a subscription request for the notifications, wherein the subscription request includes the received access token, a primary notification endpoint, and binding information usable for selecting an alternative notification endpoint from the list.

2. The method of claim 1, further comprising receiving at least one notification from the service producer NF via an alternative notification endpoint that is included in the access token and is also indicated by the binding information.

3. The method of claim 2, wherein:
    the request for the access token also includes an identifier of an instance of the service consumer NF that is a primary notification endpoint; and
    the at least one notification is received via the alternative notification endpoint when the primary notification endpoint is not reachable.

4. The method of claim 2, wherein the subscription request is sent to the service producer NF via a service communication proxy (SCP) of the communication network, and the at least one notification is received via the alternative notification endpoint and the SCP.

5. The method of claim 1, wherein:
the request for the access token and the subscription request are on behalf of a second service consumer NF of the communication network; and
the list of alternative notification endpoints is associated with the second service consumer NF.

6. The method of claim 1, wherein the list of alternative notification endpoints is included in an AccessTokenClaims field of the access token.

7. The method of claim 6, wherein the list of alternative notification endpoints comprises a list of NF Set identifiers (IDs) of service consumer NFs that are alternative notification endpoints for which the AccessTokenClaims field is applicable.

8. Network equipment configured to implement a service consumer network function (NF) of a communication network, the network equipment comprising:
communication interface circuitry configured to communicate with a network repository function (NRF) and a service producer NF of the communication network; and
processing circuitry operably coupled to the communication interface circuitry, wherein the processing circuitry and the communication interface circuitry are configured to perform the method of claim 1.

9. A method performed by a service producer network function (NF) of a communication network, the method comprising:
receiving, from a service consumer NF of the communication network, a subscription request for notifications from the service producer NF, wherein:
the subscription request includes an identifier of a primary notification endpoint, binding information usable for selecting an alternative notification endpoint for the notifications, and an access token for receiving the notifications; and
the access token includes a list of alternative notification endpoints.

10. The method of claim 9, wherein:
the subscription request is on behalf of a second service consumer NF of the communication network; and
the list of alternative notification endpoints is associated with the second service consumer NF.

11. The method of claim 9, further comprising:
responsive to determining that the primary notification endpoint is unreachable, selecting an alternative notification endpoint based on the binding information; and
based on verifying that the selected alternative notification endpoint is included in the list in the access token, sending at least one notification to the selected alternative notification endpoint.

12. The method of claim 9, wherein:
the subscription request is received from the service consumer NF via a service communication proxy (SCP); and
the method further comprises:
verifying the binding information against the list of alternative notification endpoints included in the access token;
sending the identifier of the primary notification endpoint and the verified binding information to the SCP; and
sending the notifications to the SCP for delivery to the primary notification endpoint or to an alternative notification endpoint.

13. The method of claim 12, wherein the list of alternative notification endpoints comprises a list of NF Set identifiers (IDs) of service consumer NFs that are alternative notification endpoints for which the AccessTokenClaims field is applicable.

14. The method of claim 9, wherein the list of alternative notification endpoints is included in an AccessTokenClaims field of the access token.

15. Network equipment configured to implement a service producer network function (NF) of a communication network, the network equipment comprising:
communication interface circuitry configured to communicate with a network repository function (NRF) and a service consumer NF of the communication network; and
processing circuitry operably coupled to the communication interface circuitry, wherein the processing circuitry and the communication interface circuitry are configured to perform the method of claim 9.

16. A method performed by a network repository function (NRF) of a communication network, the method comprising:
receiving, from a service consumer network function (NF) of the communication network, a request for an access token for notifications from a service producer NF of the communication network, wherein the request includes a list of alternative notification endpoints;
authorizing the request based on verifying the alternative notification endpoints; and
based on authorizing the request, sending to the service consumer NF an access token for receiving the notifications from the service producer NF, wherein the access token includes the list of alternative notification endpoints.

17. The method of claim 16, wherein authorizing the request comprises verifying that the alternative notification endpoints match corresponding values in one of the following: a public key certificate of the service consumer NF, or a NF profile of the service consumer NF.

18. The method of claim 16, wherein:
the request for the access token also includes an identifier of an instance of the service consumer NF that is a primary notification endpoint; and
authorizing the request is further based on verifying the primary notification endpoint.

19. The method of claim 16, wherein:
the request for the access token is on behalf of a second service consumer NF of the communication network; and
the list of alternative notification endpoints is associated with the second service consumer NF.

20. The method of claim 16, wherein the list of alternative notification endpoints is included in an AccessTokenClaims field of the access token.

21. The method of claim 20, wherein the list of alternative notification endpoints comprises a list of NF Set identifiers (IDs) of service consumer NFs that are alternative notification endpoints for which the AccessTokenClaims field is applicable.

22. Network equipment configured to implement a network repository function (NRF) of a communication network, the network equipment comprising:
communication interface circuitry configured to communicate with a service consumer network function (NF) and a service producer NF of the communication network; and
processing circuitry operably coupled to the communication interface circuitry, wherein the processing circuitry and the communication interface circuitry are configured to perform the method of claim 16.

\* \* \* \* \*